(12) United States Patent
Stout et al.

(10) Patent No.: US 7,694,937 B2
(45) Date of Patent: Apr. 13, 2010

(54) OUTFLOW VALVE

(75) Inventors: David E. Stout, Tucson, AZ (US); Tom J. Phielix, Tucson, AZ (US); Christopher L. Thomas, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 810 days.

(21) Appl. No.: 11/501,983

(22) Filed: Aug. 9, 2006

(65) Prior Publication Data
US 2008/0035872 A1    Feb. 14, 2008

(51) Int. Cl.
*F16K 1/22*  (2006.01)

(52) U.S. Cl. .................. 251/143; 251/148; 251/151; 251/313; 137/375; 285/364; 285/370

(58) Field of Classification Search .............. 251/118, 251/143, 148, 151, 313; 137/375; 285/62, 285/205, 364, 370
See application file for complete search history.

(56) References Cited

U.S. PATENT DOCUMENTS

| | | | |
|---|---|---|---|
| 3,027,133 A | | 3/1962 | Anderson |
| 4,205,783 A | * | 6/1980 | Dietsche et al. ............. 236/1 G |
| 4,348,006 A | | 9/1982 | Schmitt et al. |
| 4,537,425 A | * | 8/1985 | Press et al. ..................... 285/55 |
| 4,552,332 A | | 11/1985 | Sonderegger et al. |
| 4,630,635 A | * | 12/1986 | Bernstein et al. ....... 137/315.07 |
| 4,653,724 A | | 3/1987 | Garrigues et al. |
| 4,822,001 A | | 4/1989 | Sisk |
| 5,100,103 A | | 3/1992 | Conley et al. |
| 5,174,615 A | * | 12/1992 | Foster et al. ............. 285/334.2 |
| 5,462,706 A | * | 10/1995 | McMillan et al. ........... 264/138 |
| 5,664,760 A | | 9/1997 | Army, Jr. et al. |
| 5,756,890 A | | 5/1998 | Fedison, Jr. |
| 5,876,015 A | | 3/1999 | Schaeffer et al. |
| 6,352,241 B1 | | 3/2002 | Hannewald et al. |
| 7,107,662 B1 | * | 9/2006 | Levario ....................... 29/505 |

* cited by examiner

*Primary Examiner*—John Rivell
*Assistant Examiner*—Jeremy S Baskin
(74) *Attorney, Agent, or Firm*—Oral Caglar, Esq.

(57) ABSTRACT

A valve assembly configured to be mounted on a support structure comprises a flowbody having a first port, a second port, and a flow passage there between. A flange is coupled around the flowbody proximate the first port. A sleeve extends into the flowbody through the first port, and a radial lip is coupled to the sleeve proximate the first port. A retaining ring is coupled to the flange and configured to confine the radial lip between the retaining ring and the support structure to secure the sleeve within the flowbody when the valve assembly is mounted on the support structure.

10 Claims, 4 Drawing Sheets

OUTFLOW VALVE

TECHNICAL FIELD

The present invention relates generally to valves and, more specifically, to an outflow valve that is particularly suited for deployment on an aircraft as a cabin pressure outflow valve.

BACKGROUND

Aircraft often fly at high altitudes, which are characterized by relatively low ambient pressures. To provide passengers with a pleasant environment, it is desirable to maintain aircraft cabin pressure (commonly referred to as "cabin pressure altitude") within a relatively comfortable range during flight. This may be accomplished by controlling the rate at which air escapes from the aircraft's cabin utilizing one or more pressure outflow valves. Preferably, such outflow valves are relatively lightweight and compact, while at the same time being relatively durable and reliable. Furthermore, regulations require that such outflow valves employ redundancy features capable of mitigating single point failure situations, such as crack formation and propagation.

One known type of outflow valve that achieves the above-described goals comprises a non-metallic (e.g., plastic) flowbody having a flow passage therethrough, a rotatable shaft disposed in the flowbody, and a valve element (e.g., a butterfly valve plate) mounted on the shaft and disposed within the flow passage. The shaft is coupled to a valve actuator, which is, in turn, coupled to a controller. In response to commands from the controller, the actuator rotates the shaft to adjust the position of the valve and thereby control the rate of airflow through the flow passage. To reinforce the plastic flowbody and to provide the required redundancy, a metallic (e.g., aluminum) sleeve is disposed within the flow passage such that the sleeve's outer surface is substantially contiguous with the flowbody's inner surface thereby creating a dual-walled flow passage. The sleeve is coupled to the flowbody via an adhesive and a plurality of brackets and fasteners (e.g., rivets). The brackets may each be L-shaped and include first and second openings therethrough. The first opening receives a first rivet that passes through (and thus couples) the flowbody and the sleeve, and the second larger opening receives a mounting bolt, which passes through a radial mounting flange provided around an end of the flowbody and through an aircraft support structure (e.g. a bulkhead) thereby attaching the flowbody and the sleeve to the aircraft's fuselage.

Although meeting many of the previously identified design goals, outflow valves of the type described are limited in certain respects. For example, as each bracket must be individually riveted, the production of such valves may be relatively time consuming and costly. Furthermore, the riveting process increases the risk of deforming the sleeve and of damaging (e.g., cracking) the plastic flowbody. Additionally, undue stress may be placed on the sleeve because the sleeve is not directly coupled to the support structure and because the riveted brackets do not evenly distribute the clamping force about the sleeve's circumference. Finally, the employment of multiple riveted brackets increases part count and negatively impacts the valve's appearance.

Considering the foregoing, it should be appreciated that it would be desirable to provide an outflow valve having a redundancy feature wherein the sleeve is secured to the flowbody without the use of multiple rivets or other such fasteners. It should also be appreciated that it would be desirable for such an outflow valve to utilize a sleeve attachment means that directly couples the sleeve to the support structure and that substantially evenly distributes the clamping force about the sleeve's circumference. Other desirable features and characteristics of the present invention will become apparent from the subsequent detailed description of the invention and the appended claims, taken in conjunction with the accompanying drawings and this background of the invention.

BRIEF SUMMARY

A valve assembly configured to be mounted on a support structure comprises a flowbody having a first port, a second port, and a flow passage there between. A flange is coupled around the flowbody proximate the first port. A sleeve extends into the flowbody through the first port, and a radial lip is coupled to the sleeve proximate the first port. A retaining ring is coupled to the flange and configured to confine the radial lip between the retaining ring and the support structure to secure the sleeve within the flowbody when the valve assembly is mounted on the support structure.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
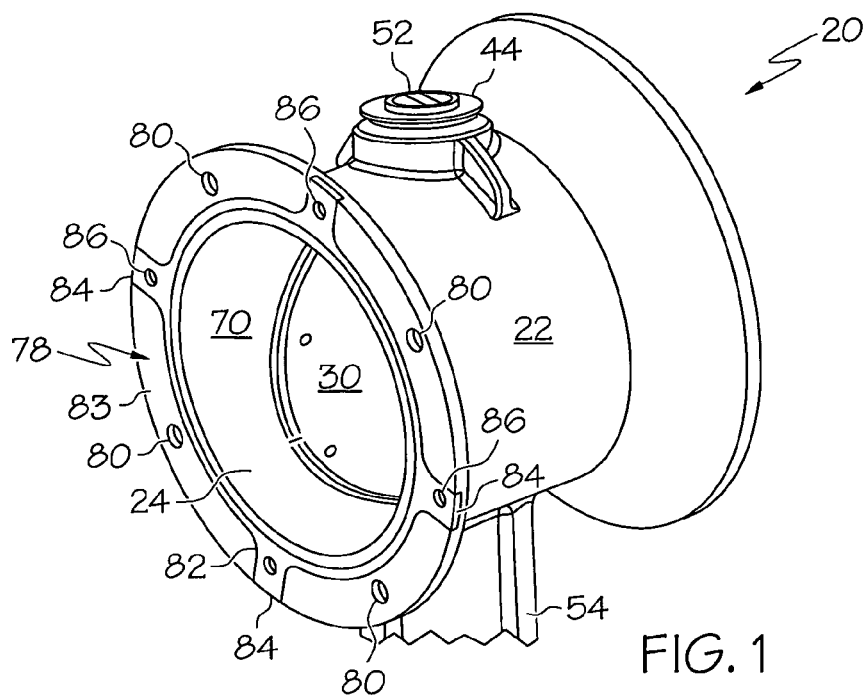
FIGS. 1 and 2 are isometric and front views, respectively, of a pressure outflow valve in accordance with an exemplary embodiment of the present invention.
Figure 2:
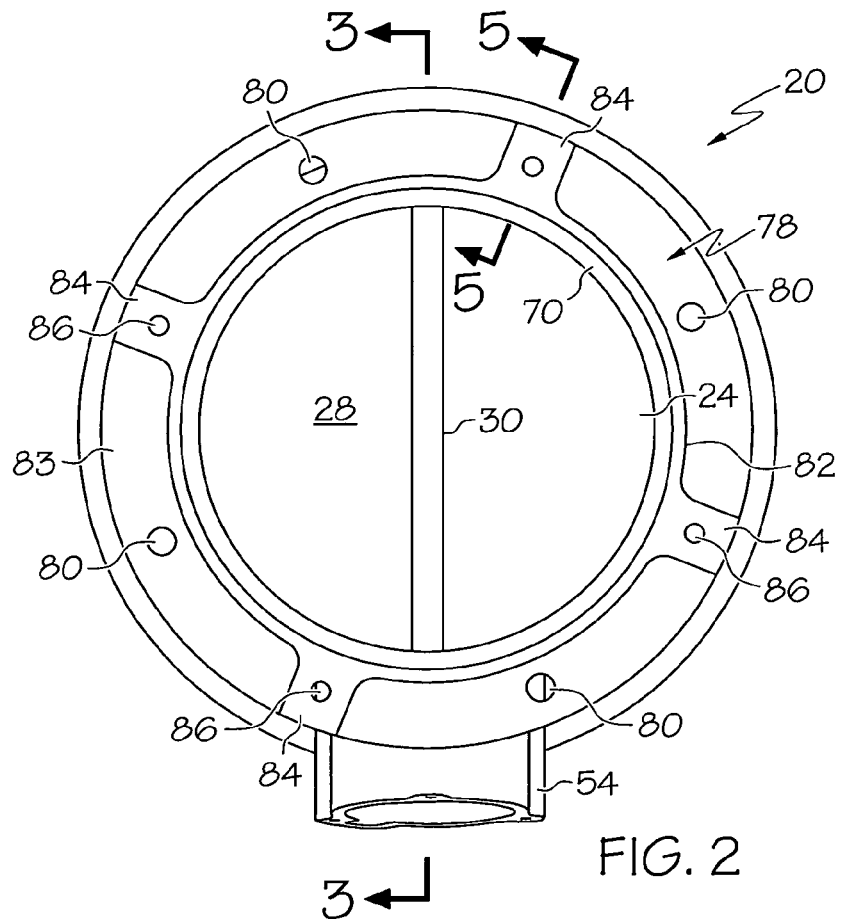
Figure 3:
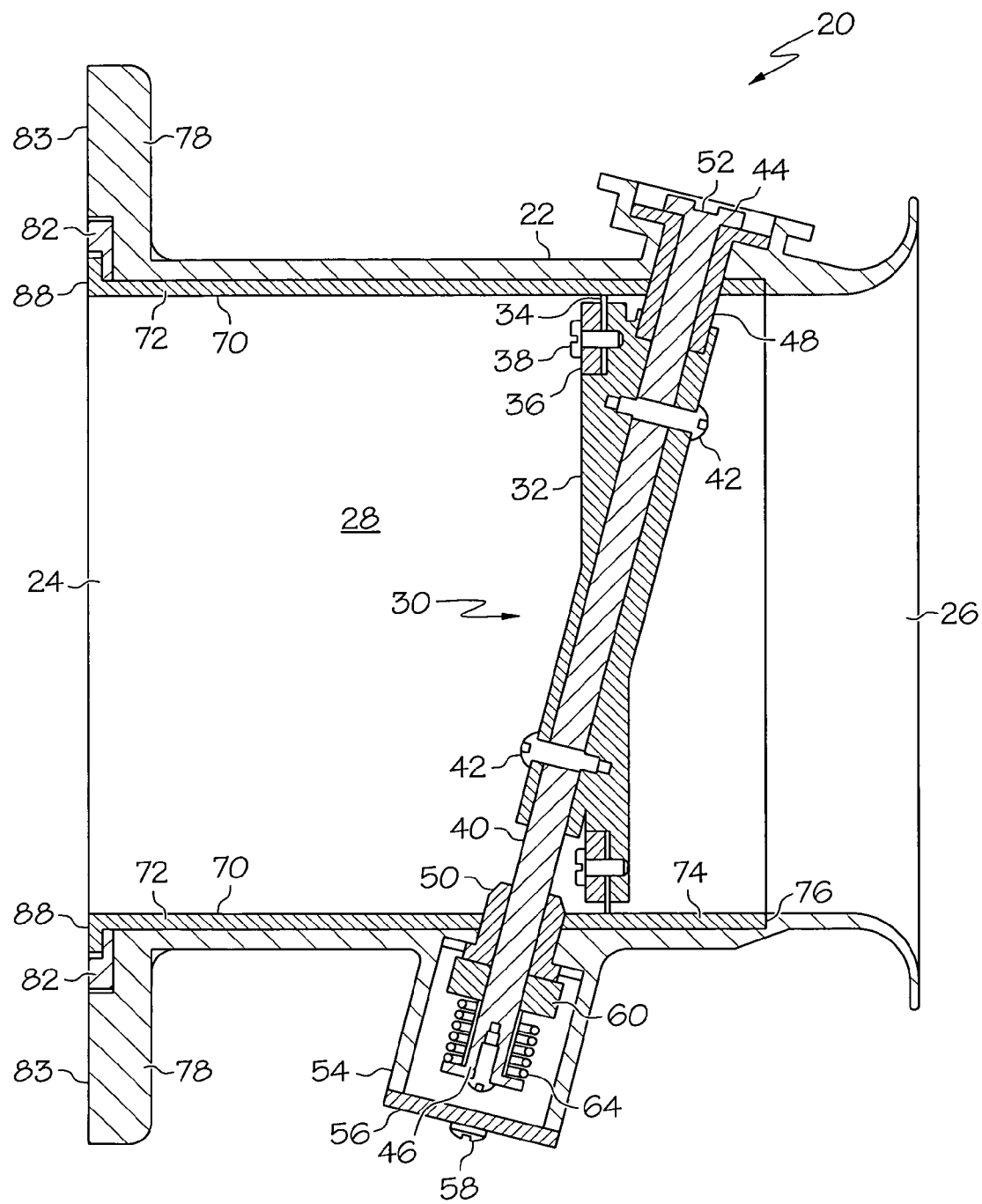
FIG. 3 is a cross-sectional view taken along line 3-3 of the outflow valve shown in FIGS. 1 and 2.

FIGS. 1 and 2 are isometric and front views, respectively, of a valve assembly 20 (e.g., an outflow valve), and FIG. 3 is a cross-sectional view of valve assembly 20 taken along line 3-3 (FIG. 2). Outflow valve assembly 20 comprises a valve flowbody 22 having a first flow port 24, a second flow port 26 (FIG. 3), and a flow passage 28 there between. Valve assembly 20 may be utilized in a variety of applications; e.g., valve assembly 20 may be deployed on an aircraft as a pressure control outflow valve. If valve assembly 20 is so employed, flowbody 22 is preferably constructed of a lightweight polymer, such as fiber-reinforced polyetherimide (PEI), fiber-reinforced polyetheretherketon (PEEK), or various other moldable plastics. A valve element 30 is disposed within flowbody 22 and may comprise one or more conventional valve components. For example, as shown in FIG. 3, valve element 30 may comprise a butterfly plate 32 (e.g., fiber-reinforced PEI, fiber-reinforced PEEK, aluminum, etc.), a wiper seal 34 (e.g., Dacron reinforced silicon material), and a reinforcing ring 36 (e.g., steel), which are joined together via a plurality of fasteners 38.

A shaft 40 (FIG. 3) is mounted within flowbody 22 and configured for rotational movement therein. Valve element 30 is coupled to shaft 40 by way of, for example, an internal serration provided through valve element 30. Alternatively, and as illustrated in FIG. 3, valve element 30 may be attached to shaft 40 by way of a plurality of fasteners 42. Shaft 40 includes a first end portion 44 and a second end portion 46 substantially opposite end portion 44. First and second shaft sleeves 48 and 50 are disposed around end portions 44 and 46, respectively. Shaft sleeves 48 and 50 reinforcing shaft 40 and may serve as bearings that facilitate the rotational movement of shaft 40 within flowbody 22; however, it should be appreciated that annular bearings (e.g., ball bearings, roller bearings, etc.) may be employed in lieu of, or in addition to, shaft sleeves 48 and 50.

End portion 44 of shaft 40 is provided with an actuator interface 52 (e.g., a slot) that permits shaft 40 to be coupled to a non-illustrated valve actuator (e.g., an electromechanical, pneumatic, or hydraulic actuator). The actuator selectively rotates shaft 40 in response to commands from a controller (not shown) to adjust the rotational positioning of valve element 30 within flow passage 28. For example, the actuator may rotate shaft 40 to move valve element 30 between a substantially open position, a substantially closed position, and various intermediate positions. By adjusting the rotational positioning of valve element 30 in this manner, the rate of pressurized airflow through flow passage 28 may be controlled. If employed as a pressure outflow control valve, valve assembly 20 may be mounted to such that flow port 24 is in fluid communication with a passenger cabin and flow port 26 is in fluid communication with an ambient air source. By adjusting the positioning of valve element 30 within flow passage 28, the rate of airflow from the aircraft's cabin to the ambient air source may be controlled and, consequently, a desired cabin pressure altitude may be maintained. To increase air speed and to reduce total pressure drop, flowbody 22 may be molded such that a bellmouth is formed proximate flow port 26.

Figure 4:
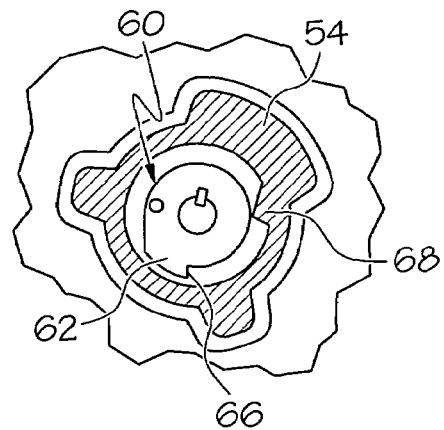
FIG. 4 is a cutaway view of the valve closure and rotational stop mechanism employed by the outflow valve shown in FIGS. 1-3.

Second end portion 46 of shaft 40 is received by a valve closure and rotational stop housing 54, which may be formed (e.g., molded) as a feature of flowbody 22. Housing 54 includes a cover plate 56 (FIG. 3), which may be removably attached to housing 54 via a fastener 58. A valve closure and rotational stop mechanism 60 resides within housing 54. As can be seen in FIG. 3 and also in FIG. 4 (a cutaway view of housing 54 and mechanism 60) valve closure and rotational stop mechanism 60 comprises a shaft boss 62 (FIG. 4) and a torsion spring 64 (FIG. 3), which is disposed around end portion 46 of shaft 40. Torsion spring 64 is configured to supply a bias torque to shaft 40 to bias valve element 30 toward a predetermined position (e.g., a closed position). Shaft boss 62 is mounted on end portion 46 of shaft 40 and includes a stop surface 66 protruding therefrom. When valve element 30 rotates into the predetermined position, stop surface 66 abuttingly engages an end-of-travel stop 68, which may be integrally formed as part of housing 54. In this manner, valve closure and rotational stop mechanism 60 is configured to bias valve element 30 to, for example, a closed position in the absence of a driving force applied by the valve actuator.

Regulations require that a cabin pressure outflow valve employ a redundancy feature to mitigate a single point failure situation (e.g., crack formation). In the case of outflow valve assembly 20, redundancy is provided by an inner liner or sleeve 70 disposed within flowbody 22. Sleeve 70 is preferably at least partially constructed of a metal or alloy, such as aluminum. Sleeve 70 cooperates with flowbody 22 to form a dual-walled flow passage through valve assembly 20. That is, sleeve 70 extends into flowbody 22 through flow port 24 such that the outer surface of sleeve 70 is substantially contiguous with the inner surface of flowbody 22. In the illustrated embodiment, sleeve 70 comprises an elongated, substantially tubular body having an outer diameter slightly less than the diameter of flow passage 28. As shown in FIG. 3, sleeve 70 further comprises a first end portion 72 and a second end portion 74, which may abut an inner step 76 (e.g., an annular ridge) provided within flowbody 22 proximate flow port 26. A projection 88 (e.g., a radial lip) radially extends from first end portion 72 and may have an outer diameter larger than the diameter of flow passage 28. Radial lip 88 is configured to be mounted on a support structure to secure sleeve 70 within flowbody 22 as described below in detail in conjunction with FIGS. 5 and 6.

A radial mounting flange 78 is disposed around flowbody 22 proximate flow port 24 to facilitate the mounting of valve assembly 20. Mounting flange 78 may be integrally formed (e.g., molded) as a feature of flowbody 22 and includes a plurality of fastener openings 80 therethrough (FIGS. 1 and 2). For example, mounting flange 78 may include eight fastener openings 80 therethrough, which are evenly spaced around flange 78; however, only four of openings 80 may be seen in FIGS. 1 and 2 due to the presence of a retaining ring 82. Retaining ring 82 may comprise a body (e.g., a flattened annulus) having a plurality of (e.g., four) projections or tabs 84 extend radially therefrom. When coupled to flange 78, a first surface of retaining ring 82 abuttingly engages a radial contact surface 83 provided around flange 78. Flange 78 preferably includes a concavity or depression formed within radial contact surface 83 for receiving retaining ring 82. This concavity may generally conform to the shape of retaining ring 82 such that, when coupled to flange 78, retaining ring 82 cooperates with contact surface 83 to form a substantially planar mounting surface.

Retaining ring 82 further comprises a plurality of fastener openings 86 therethrough, each of which may be disposed through a different one of radial tabs 84. When retaining ring 82 engages flange 78 (e.g., is received by the depression provided in radial contact surface 83), each of openings 86 aligns with a different one of openings 80 to form a series of channels through the resulting flange/ring assembly. This may be most easily appreciated by referring to FIG. 5, which is a cross-section of a portion of valve assembly 20 through one of tabs 84 (i.e., along line 5-5 shown in FIG. 2). As described below in conjunction with FIG. 6, a fastener is disposed through each pair of openings 86 and 80 to couple retaining ring 82 to flange 78 and, more generally, to mount valve assembly 20 on a support structure, such as an aircraft bulkhead.

When sleeve 70 is disposed within flowbody 22, radial lip 88 of sleeve 70 is abuttingly engaged by a second surface of retaining ring 82. In particular, radial lip 88 is contacted by an inner portion 90 of retaining ring 82, which resides proximate (e.g., substantially encircles) port 24. Inner portion 90 preferably includes a depression or notch therein, which may take the form of an annular recess (e.g., a rabbet notch) disposed proximate an inner edge of ring 82. Radial lip 88 is received by the notch provided in inner portion 90. The dimensions of the notch provided in inner portion 90 are preferably such that radial lip 88 and retaining ring 82 cooperate to form a substantially planar mounting surface; e.g., radial lip 88 and retaining ring 82 may form a half lap joint as illustrated. As may be most easily appreciated by referring to FIG. 3, the substantially planar mounting surface formed by retaining ring 82 and radial lip 88 is substantially contiguous with the mounting surface formed by retaining ring 82 and flange 78. It should thus be appreciated that retaining ring 82, radial lip 88, and flange 78 cooperate to collectively define a substantially planar mounting surface proximate port 24 of valve assembly 20.

Figure 5:
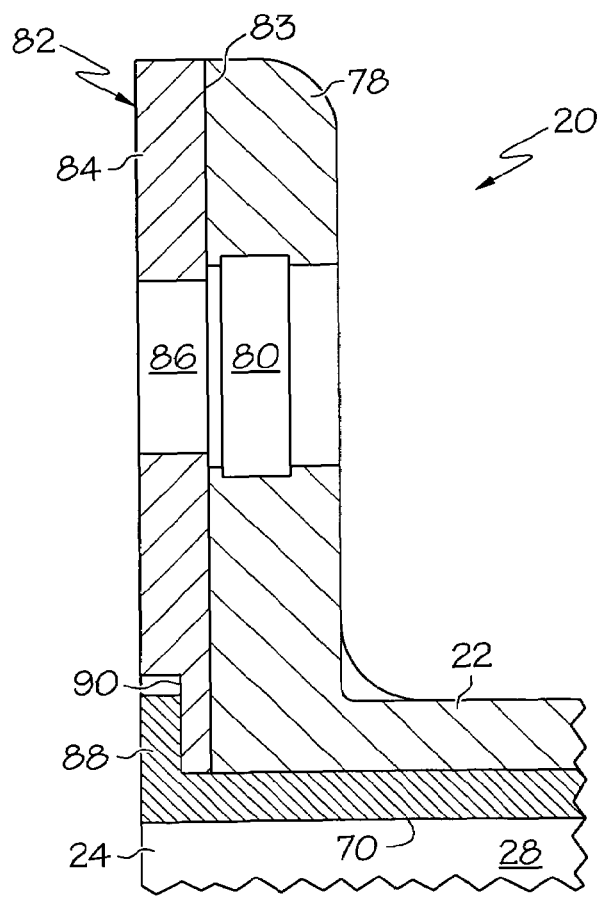
FIG. 5 is a cross-sectional view of a portion of the valve shown in FIGS. 1-3 taken along line 5-5 (FIG. 2)
Figure 6:
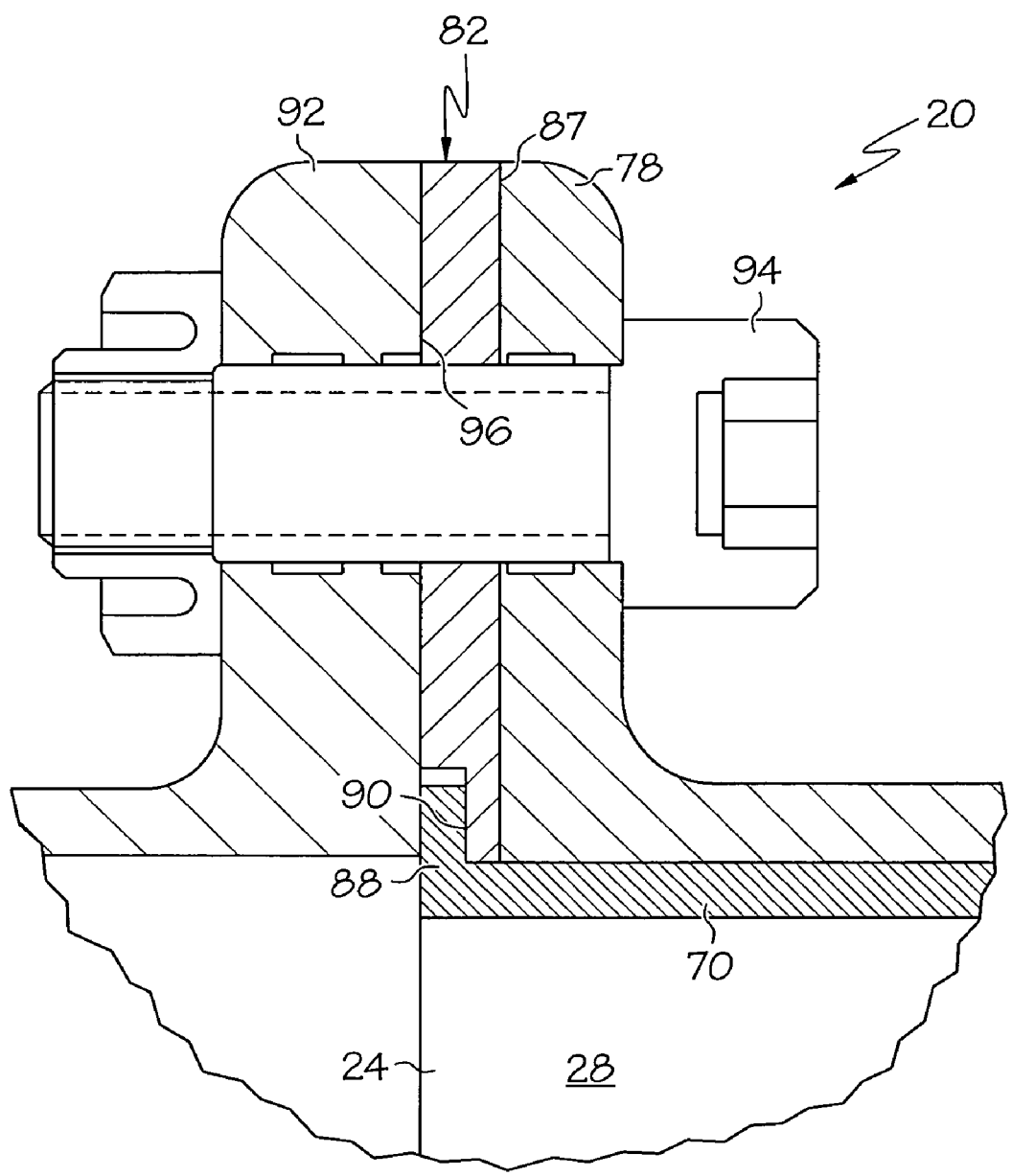
FIG. 6 is a cross-sectional view of the portion of the valve shown in FIG. 5 after attachment to a support structure.

FIG. 6 is a cross-sectional view of the portion of valve assembly 20 shown in FIG. 5 after valve assembly 20 has been mounted on an aircraft bulkhead 92. A plurality of fasteners 94 (only one of which is shown in FIG. 6) extends through bulkhead 92, flange 78, and retaining ring 82 to couple valve assembly 20 to bulkhead 92. When valve assembly 20 and bulkhead 92 are joined in this manner, the planar mounting surface formed by retaining ring 82, radial lip 88, and flange 78 is held flush against a wall 96 of bulkhead 92. Radial lip 88 is thus directly secured by retaining ring 82 to bulkhead 92; that is, radial lip 88 is physically confined or captured between portion 90 of retaining ring 82 and wall 96 of bulkhead 92. Since retaining ring 82 continually engages radial lip 88 about its circumference, ring 82 exerts an axial clamping force on lip 88 that is substantially evenly distributed about the circumference of sleeve 70. It should thus be appreciated that, in exemplary valve assembly 20, sleeve 70 is directly coupled to bulkhead 92 by way of retaining ring 82 and thereby maintained within flowbody 22 without the use of multiple brackets and fasteners.

If desired, sleeve 70 may be adhesively secured within flowbody 22. Additionally, flowbody 22 may be molded to include one or more longitudinal ribs along its inner surface that may be utilized to help locate sleeve 70 within flow passage 28. In the exemplary embodiment, retaining ring 82 includes a depression (e.g., an annular recess or a rabbet notch) for receiving radial lip 88; however, it should be appreciated that retaining ring 82 need not include such a depression or notch. Similarly, mounting flange 78 need not include a depression for receiving retaining ring 82 and/or radial lip 88. Moreover, although retaining ring 82, flange 78, and radial lip 88 are described above as being coupled to bulkhead 92 via fasteners 94, it should be appreciated that these components of valve assembly 20 may instead be mounted on a support structure utilizing other attachment means (e.g., welding).

It should thus be appreciated that an outflow valve having a redundancy feature has been provided in which a sleeve is secured within a flowbody without the use of multiple rivets or other such fasteners. It should also be appreciated that an embodiment of the present invention has been provided that utilizes a retaining ring to directly couple the sleeve to a support structure while distributing the clamping force about the sleeve's circumference. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A valve assembly configured to be mounted on a support structure, the valve assembly comprising:
   a flowbody having a first port, a second port, an inner surface defining a flowbody inner diameter, and a flow passage there between;
   a flange coupled around said flowbody proximate said first port;
   a sleeve extending longitudinally along the inner surface into said flowbody through said first port;
   a radial lip coupled to said sleeve extending radially about said first port, wherein the radial lip includes a radial lip outer diameter larger than the flowbody inner diameter; and
   a retaining ring coupled to said flange including a plurality of fastener openings positioned a first radial distance from the inner surface, the retaining ring further including an annular recess disposed a second radial distance from the inner surface that is less than the first radial distance, wherein the annular recess receives said radial lip within the annular recess and between said retaining ring and the support structure to secure said sleeve within said flowbody when the valve assembly is mounted on the support structure.

2. A valve assembly according to claim 1 wherein said sleeve comprises a substantially tubular body having a first end portion and a second end portion, said radial lip coupled to said first end portion.

3. A valve assembly according to claim 2 wherein said flowbody includes an inner step within said flow passage, said second end portion abutting said inner step.

4. A valve according to claim 2 wherein said tubular body has an outer diameter less than a diameter of the flow passage.

5. A valve assembly according to claim 1 wherein said retaining ring comprises:
   a substantially annular body; and
   a plurality of tabs extending radially from said annular body.

6. A valve assembly according to claim 5 wherein each fastener opening is provided through each of said plurality of tabs.

7. A valve assembly according to claim 1 wherein said retaining ring and said radial lip form a substantially planar mounting surface.

8. A pressure outflow valve assembly configured to be coupled to an aircraft support structure via a plurality of fasteners, the pressure outflow valve assembly comprising:
   a flowbody constructed at least partially of a non-metallic material, said flowbody including an inner surface defining a flow passage therethrough;
   a mounting flange fixedly coupled to an end of said flowbody;
   a valve element disposed within said flow passage and moveable between at least first and second positions, the valve element including a torsion spring supplying a bias torque to bias the valve element toward the first position;
   a sleeve constructed at least partially of a metallic material, said sleeve comprising:
      an elongated body having a first end portion, a second end portion, and an outer surface substantially adjacent with said inner surface, said first end portion residing within said flowbody and said second end portion residing outside of said flowbody proximate said mounting flange; and
      a radial lip fixedly coupled to said second end portion;

a retaining ring abuttingly engaging said mounting flange, said retaining ring including an annular depression therein disposed at a first radial distance from the inner surface for receiving said radial lip; and a plurality of apertures each disposed through the support structure, the mounting flange, and the retaining ring at a second radial distance from the inner surface wherein the second radial distance is farther away from the inner surface than the first radial distance, said plurality of apertures configured to receive said plurality of fasteners to secure said radial lip between the support structure and said retaining ring so as to maintain said elongated body within said flow passage.

9. A pressure outflow valve assembly according to claim 8 wherein the support structures includes a wall, said retaining ring being coupled between said mounting flange and the wall when the valve assembly is coupled to the support structure.

10. A pressure outflow valve assembly according to claim 9 wherein said radial lip is held between said retaining ring and the wall when the valve assembly is coupled to the support structure.

* * * * *